United States Patent
Floyd et al.

(10) Patent No.: US 9,410,838 B2
(45) Date of Patent: Aug. 9, 2016

(54) ADJUSTABLE UNDERGROUND METER INSTALLATION

(71) Applicant: Mueller International, LLC, Atlanta, GA (US)

(72) Inventors: Scott P. Floyd, Whitwell, TN (US); Bobby Wade Pope, Cleveland, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 14/677,551

(22) Filed: Apr. 2, 2015

(65) Prior Publication Data
US 2015/0226592 A1 Aug. 13, 2015

Related U.S. Application Data

(62) Division of application No. 12/564,459, filed on Sep. 22, 2009, now Pat. No. 9,032,989.

(60) Provisional application No. 61/098,986, filed on Sep. 22, 2008.

(51) Int. Cl.
| | |
|---|---|
| *E03B 9/10* | (2006.01) |
| *G01F 15/18* | (2006.01) |
| *E02D 29/12* | (2006.01) |
| *E03B 7/09* | (2006.01) |
| *G01F 15/10* | (2006.01) |

(Continued)

(52) U.S. Cl.
CPC .............. *G01F 15/18* (2013.01); *E02D 29/12* (2013.01); *E02D 29/125* (2013.01); *E03B 7/072* (2013.01); *E03B 7/095* (2013.01); *E03B 9/10* (2013.01); *G01F 15/10* (2013.01); *G01F 15/14* (2013.01); *G01F 15/185* (2013.01); *Y10T 137/6991* (2015.04); *Y10T 137/6995* (2015.04); *Y10T 137/7017* (2015.04)

(58) Field of Classification Search
CPC ........... G01F 15/18; E03B 7/07; E03B 7/072; E03B 7/095; E03B 9/10
USPC .................................................. 403/107, 108
See application file for complete search history.

(56) References Cited

U.S. PATENT DOCUMENTS

| | | |
|---|---|---|
| 219,098 A | 9/1879 | Jewell |
| 420,044 A | 1/1890 | Dennis |
| 469,005 A | 2/1892 | Anderson |

(Continued)

FOREIGN PATENT DOCUMENTS

| | | |
|---|---|---|
| CA | 2679774 | 3/2010 |
| EP | 1422353 | 5/2004 |

(Continued)

OTHER PUBLICATIONS

Floyd, Scott P.; Issue Notification for U.S. Appl. No. 13/460,956, filed May 1, 2012, mailed Jan. 6, 2016, 1 pg.

(Continued)

*Primary Examiner* — Kevin Murphy
(74) *Attorney, Agent, or Firm* — Taylor English Duma LLP

(57) ABSTRACT

A pit liner includes an upper section, a lower section, at least one pin wherein each pin is connected to one of the upper section and the lower section, and at least one notch defined in at least one of the upper section and the lower section the lower section and the upper section sized to adjust with respect to each other.

20 Claims, 4 Drawing Sheets

(51) Int. Cl.
*E03B 7/07* (2006.01)
*G01F 15/14* (2006.01)

(56) References Cited

U.S. PATENT DOCUMENTS

| | | | |
|---|---|---|---|
| 479,909 | A | 8/1892 | Hurley |
| 503,818 | A | 8/1893 | Watt |
| 620,588 | A | 3/1899 | Hoppes |
| 627,911 | A | 6/1899 | Estill |
| 754,414 | A | 3/1904 | Bossert |
| 1,101,908 | A | 6/1914 | Dennison |
| 1,151,132 | A | 8/1915 | Stary |
| 1,158,471 | A | 11/1915 | Felstead |
| 1,608,772 | A | 11/1926 | Cole |
| 2,038,806 | A | 4/1936 | Sellar |
| 2,046,330 | A | 7/1936 | Leoffert |
| 2,099,479 | A | 11/1937 | Heinkel |
| 2,511,209 | A | 6/1950 | Johnson |
| 2,748,261 | A | 5/1956 | Wolar |
| 2,931,383 | A | 4/1960 | Harold |
| 4,046,279 | A | 9/1977 | Rosler |
| 4,305,282 | A | 12/1981 | Hunt |
| 4,526,241 | A | 7/1985 | Anders |
| 4,905,725 | A | 3/1990 | Sinkinson et al. |
| 5,221,064 | A | 6/1993 | Hodges |
| 5,333,750 | A | 8/1994 | McKinnon |
| 5,588,766 | A | 12/1996 | Lai |
| 5,671,772 | A | 9/1997 | Bliss |
| 5,979,490 | A | 11/1999 | Mirlisena, Sr. |
| 6,820,646 | B2 | 11/2004 | Helle |
| 6,820,698 | B2 | 11/2004 | Haynes |
| 8,568,246 | B2 | 10/2013 | Wall et al. |
| 9,032,989 | B2 | 5/2015 | Floyd et al. |
| 9,243,944 | B2 | 1/2016 | Floyd |

FOREIGN PATENT DOCUMENTS

| | | |
|---|---|---|
| GB | 2033517 | 5/1980 |
| GB | 2194576 | 3/1988 |
| JP | 53009038 | 1/1978 |

OTHER PUBLICATIONS

Floyd, Scott P.; Notice of Allowance for U.S. Appl. No. 13/460,956, filed May 1, 2012, mailed Nov. 18, 2015, 9 pgs.

Floyd, Scott D.; U.S. Patent Application Entitled; Adjustable Underground Meter Installation; U.S. Appl. No. 12/564,459, filed Sep 22, 2009, 17 pgs.

Floyd, Scott P.; Advisory Action for U.S. Appl. No. 12/564,459, filed Sep. 22, 2009, mailed Jul. 13, 2012, 4 pgs.

Floyd, Scott P.; Applicant-Initiated Interview Summary for U.S. Appl. No. 12/564,459, filed Sep. 22, 2009, mailed Jul. 5, 2012; 3 pgs.

Floyd, Scott P.; Final Office Action for U.S. Appl. No. 12/564,459, filed Sep. 22, 2009, mailed Nov. 25, 2013; 16 pgs.

Floyd, Scott P.; Final Office Action for U.S. Appl. No. 12/564,459, filed Sep. 22, 2009, mailed Oct. 15, 2013; 21 pgs.

Floyd, Scott P.; Final Office Action for U.S. Appl. No. 12/564,459, filed Sep. 22, 2009, mailed Apr. 1, 2014, 20 pgs.

Floyd, Scott P.; Final Office Action for U.S. Appl. No. 12/564,459, filed Sep. 22, 2009, mailed May 9, 2012; 14 pgs.

Floyd, Scott P.; Final Office Action for U.S. Appl. No. 12/564,459, filed Sep. 22, 2009, mailed Jan. 2, 2015, 14 pgs.

Floyd, Scott P.; Non-Final Office Action for U.S. Appl. No. 12/564,459, filed Sep. 22, 2009, mailed Dec. 12, 2013; 22 pgs.

Floyd, Scott P.; Non-Final Office Action for U.S. Appl. No. 12/564,459, filed Sep. 22, 2009, mailed Feb. 10, 2012, 15 pgs.

Floyd, Scott P.; Non-Final Office Action for U.S. Appl. No. 12/564,459, filed Sep. 22, 2009, mailed May 10, 2013, 11 pgs.

Floyd, Scott P.; Non-Final Office Action for U.S. Appl. No. 11/564,459, filed Sep. 22, 2009, mailed Sep. 26, 2012; 17 pgs.

Floyd, Scott P.; Non-Final Office Action for U.S. Appl. No. 12/564,459, filed Sep. 22, 2009, mailed Sep. 26, 2014, 15 pgs.

Floyd, Scott P.; Notice of Allowance for U.S. Appl. No. 12/564,459, filed Sep. 22, 2009, mailed Feb. 12, 2015, 7 pgs.

Floyd, Scott P.; Final Office Action for U.S. Appl. No. 13/460,956, filed May 1, 2012, mailed Feb. 10, 2015, 15 pgs.

Floyd, Scott P.; Non-Final Office Action for U.S. Appl. No. 13/460,956, filed May 1, 2012, mailed Mar. 26, 2014, 28 pgs.

Floyd, Scott P.; Non-Final Office Action for U.S. Appl. No. 13/460,956, filed May 1, 2012, mailed Sep. 5, 2014, 5 pgs.

Floyd, Scott P.; U.S. Patent Application entitled: Adjustable Underground Meter Installation, having U.S. Appl. No. 13/460,956, filed May 1, 2012, 23 pgs.

Floyd, Scott P.; Office Action from Canadian Intellectual Property Office for Application No. 2,679,774, filed Jan. 22, 2009, mailed Feb. 18, 2011; 2 pgs.

Floyd, Scott P.; U.S. Provisional application entitled: Adjustable Underground Meter Installation, U.S. Appl. No. 61/098,986, filed Sep. 22, 2008, 8 pgs.

Floyd, Scott P.; Issue Notification for U.S. Appl. No. 12/564,459, filed Sep. 22, 2009, mailed Apr. 29, 2015, 1 pg.

Floyd, Scott P.; Supplemental Notice of Allowability for U.S. Appl. No. 12/564,459, filed Sep. 22, 2009, mailed Apr. 17, 2015, 4 pgs.

Floyd, Scott P.; Non-Final Office Action for U.S. Appl. No. 13/460,956, filed May 1, 2012, mailed Jun. 15, 2015, 10 pgs.

ADJUSTABLE UNDERGROUND METER INSTALLATION

CROSS-REFERENCE TO RELATED APPLICATIONS

This application is a divisional of U.S. application Ser. No. 12/564,459 filed Sep. 22, 2009, which claims priority to U.S. Provisional Application No. 61/098,986, filed Sep. 22, 2008, both of which are hereby specifically incorporated by reference herein in their entireties.

FIELD

Embodiments of the present disclosure generally relate to meters for underground piping systems. In particular, embodiments of the present disclosure provide improved meter installations where access to a water meter is provided through a meter pit extending beneath the surface of the earth.

BACKGROUND

In geographical areas where the prevailing temperature may be below freezing a substantial portion of the year, pipelines carrying liquid, particularly water pipelines, are laid a sufficient depth below the earth's surface to prevent freezing of the liquid carried by the pipelines. In practice, such pipelines may be laid as much as ten feet below ground level. In less cold areas, the pipelines may be laid a few feet or less below the earth's surface. In order to monitor liquid flow, flow meters are often coupled to the pipeline at selected positions. For example, a meter may be installed in the pipeline leading from a water main to a residential, commercial, or industrial user. Access to the meter is often provided by a lined meter pit so that access to the meters can be had from ground level.

U.S. Pat. No. 4,305,282 discloses a meter pit liner for use with underground pipelines. Sections of the pipeline extend into the pit and are connected to flexible tubing. The flexible tubing is then connected to a meter. The flexible tubing allows the meter to be raised towards ground level to provide access to the meter. The meter pit liner itself, however, has a fixed length.

An issue that can arise with the installation of meter pits is that the final grade of the earth surrounding the pit is not known when the pit is installed. As a result, the liner may be too long and extend above the final grade or too short and not provide sufficient protection for the meter pit. Accordingly, a need exists for improved meter pits.

SUMMARY

Various embodiments of the present disclosure provide adjustable pit liners and installation methods for surface accessible devices connected to underground pipelines. In one embodiment, a pit liner for installing a surface accessible device below ground level and in fluid communication with an underground pipeline is provided. The pit liner includes a tubular structure having an upper section and a lower section, wherein the upper section and the lower section are slideably connected in a telescoping relationship and wherein the lower section defines one or more apertures extending through a wall of the lower section. A first section of tubing is connected at one end to the pipeline through the one or more apertures in the wall of the lower section and connected at its other end to the surface accessible device and a second section of tubing is connected at one end to the pipeline through the one or more apertures in the wall of the lower section and connected at its other end to the surface accessible device. The first and second sections of tubing allow movement of the device between a lower position within the tubular structure and an upper position. A locking mechanism is also provided that selectively discourages relative axial movement in at least one direction between the upper section and the lower section to facilitate height adjustments of the tubular structure by selectively permitting the upper section to slide relative to the lower section such that the top of the upper section can be positioned proximate the ground level.

In a further embodiment, a method for installing a surface accessible device below ground level in fluid communication with an underground pipeline is provided. The method includes the steps of: forming a pit in the earth's surface; placing a lower section of a pit liner into the pit, wherein the lower section defines one or more apertures extending through a wall of the lower section; slideably connecting an upper section to the lower section in a telescoping relationship to form a pit liner; installing the surface accessible device in the pit liner; adjusting the position of the upper section in relation to the lower section such that an end of the upper section is proximate the ground level; releasably locking the upper section relative to the lower section; and connecting the surface accessible device in fluid communication with the pipeline through the one or more apertures.

BRIEF DESCRIPTION OF THE FIGURES

Figure 1:
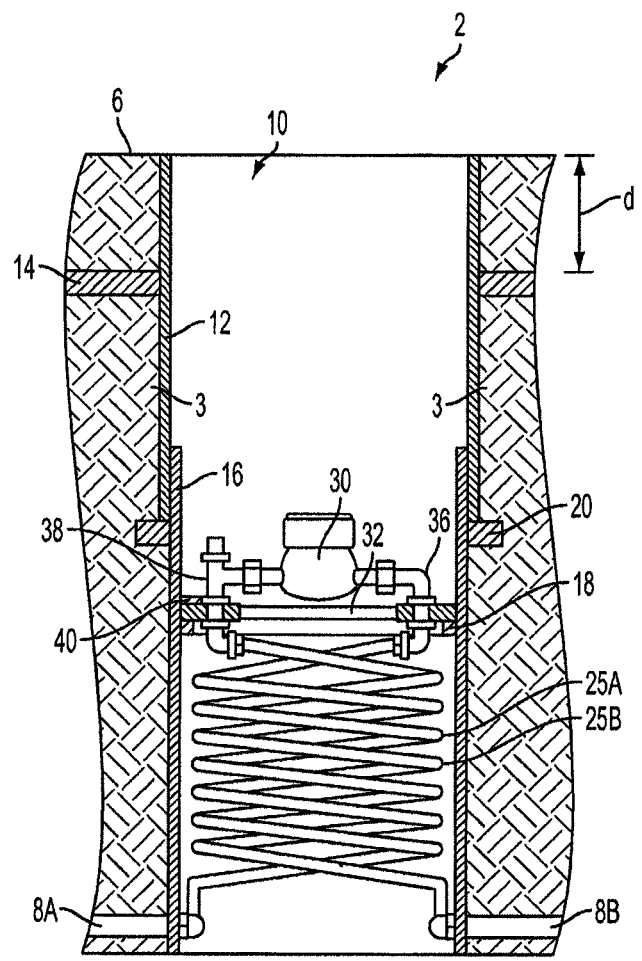

Having thus described the invention in general terms, reference will now be made to the accompanying drawings, which are not necessarily drawn to scale, and wherein:

FIG. 1 is a cross-section view of an underground meter installation in accordance with an embodiment of the current disclosure.

Figure 2:
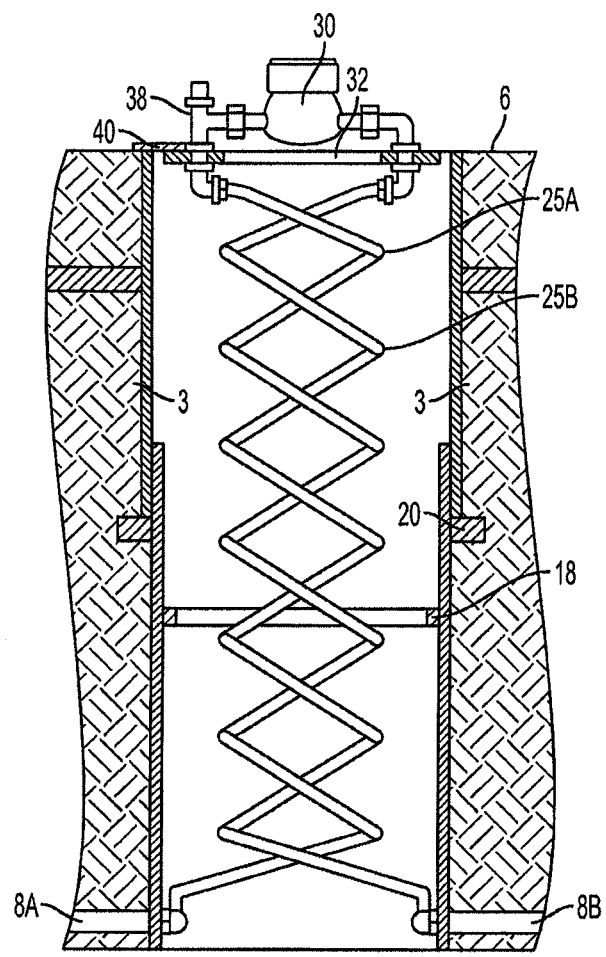

FIG. 2 is a cross-section view of the embodiment illustrated in FIG. 1 with the meter extended.

Figure 3:
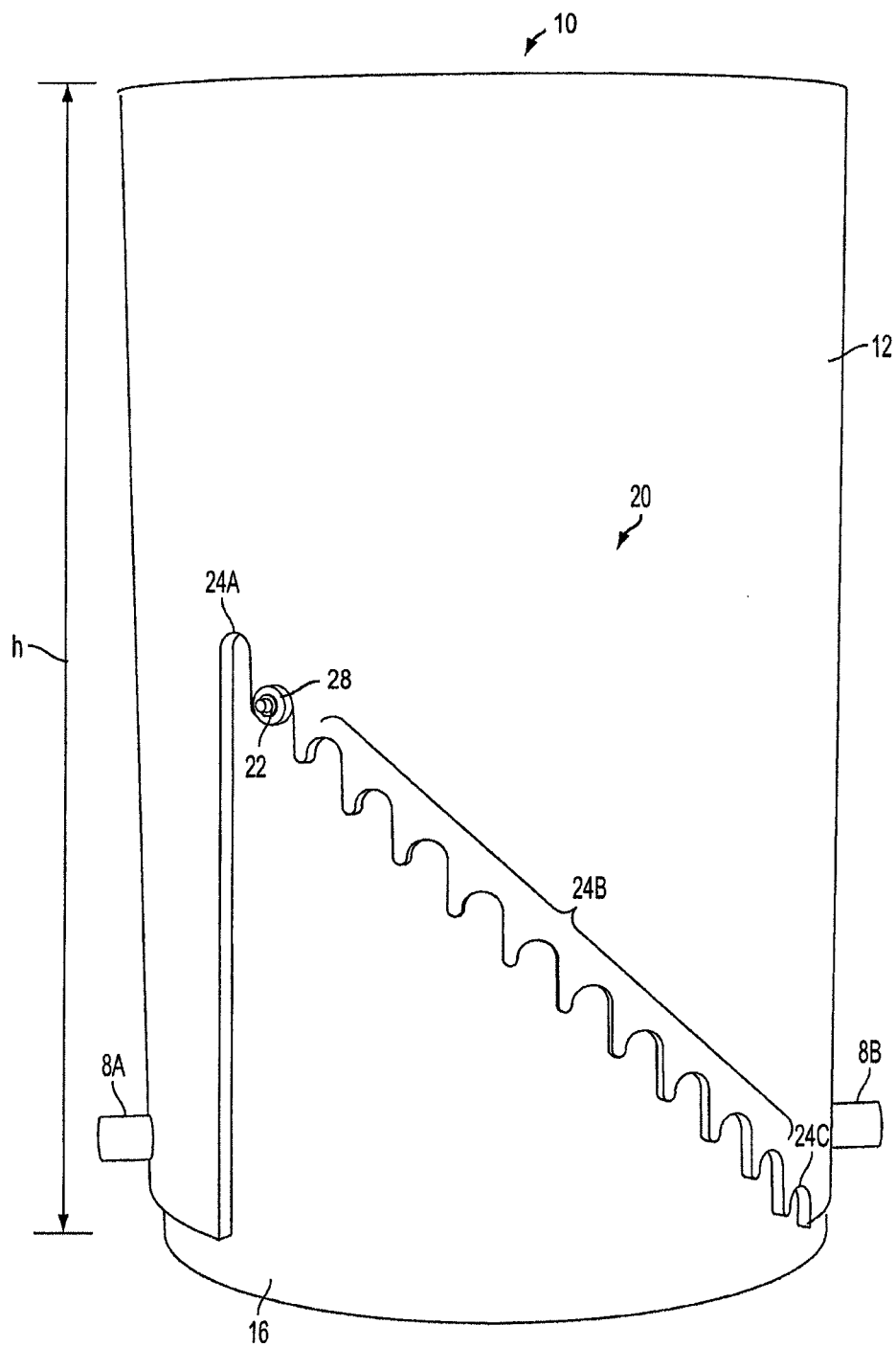

FIG. 3 is a side view of a pit liner in accordance with an embodiment of the current disclosure.

Figure 4:
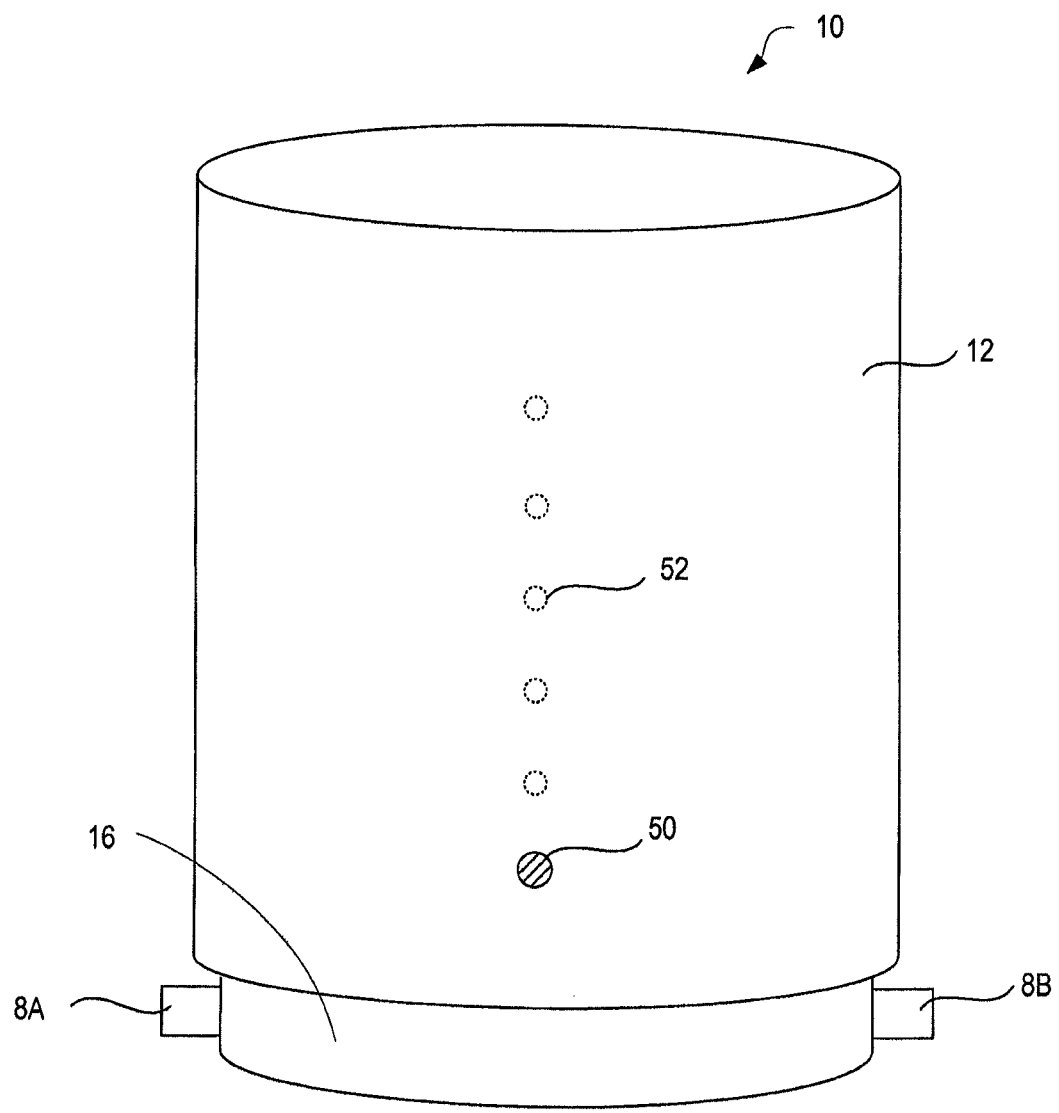

FIG. 4 is a side view of a pit liner in accordance with another embodiment of the present invention.

DETAILED DESCRIPTION

The present disclosure will now provide a more detailed description with reference to the accompanying drawings, in which some embodiments, but not all embodiments, are shown. Indeed, these embodiments may be in many different forms, and the disclosure should not be construed as limited to the embodiments set forth herein. Rather, these embodiments are provided so that this disclosure will satisfy applicable legal requirements. Like numbers refer to like elements throughout.

Various embodiments of the present disclosure provide adjustable pit liners, underground meter installations, and installation methods for surface accessible devices connected to underground pipelines. The pit liners provide surface access to devices in fluid communication with the pipeline. The adjustability of the pit liners facilitates installation of the pit liners before the final grade surrounding the pit is known. Various embodiments of the present disclosure may be used with pipelines carrying liquid or gas, and the devices may be valves, flow meters, or other known pipeline devices. To facilitate understanding, embodiments of the present disclosure will be described in the context of a flow meter and a pipeline carrying a liquid, such as water.

FIG. 1 illustrates a pit 2 extending below the surface of the earth 3. The ground level is indicated by the numeral 6, and two sections of a pipeline 8A,B are laid below ground level and extend into the pit 2.

In practice, if the underground pipeline is used to carry water in a cold area, they may be laid as much as ten to twelve feet below ground level to keep it below the frost line. Otherwise, water within the pipeline might freeze, thus impeding water flow and possibly rupturing the pipeline. In other areas, the pipeline may be laid only a few feet below ground level.

The pit 2 is defined by a tubular liner 10 and the pipeline sections 8A,B extend into the pit 2 through suitable openings in the liner 10. In the illustrated embodiment, the liner 10 has a circular cross-section, but as will be appreciated by those skilled in the art, the liner 10 may have any desired cross-sectional shape. Also, the liner 10 may be constructed of plastic and/or metal, and/or any other suitably strong material.

The liner 10 includes an upper section 12 and a lower section 16 connected in a telescoping arrangement. In some embodiments, the upper section 12 may overlap the lower section 16 by at least three inches when fully extended. A locking mechanism 20 releasably secures the upper and lower sections together such that relative axial movement is discouraged. The locking mechanism may take the form of a ratchet mechanism, a latch, a locking pin that engages one of a plurality of holes defined in one or both of the upper and lower sections, a friction clamp, screw threads or any other known or developed mechanisms for releasably locking two elements. In some embodiments, the height adjustment comprises a selection between predetermined heights (e.g., ratchet mechanism, pin/hole arrangement). In other embodiments, the height may be selected anywhere between a minimum and a maximum height (e.g., a friction clamp).

FIG. 3 illustrates one possible ratchet mechanism that may be used in accordance with an embodiment of the present disclosure. In this embodiment, the locking mechanism 20 includes a pin 22 secured to the lower section 16 that selectively engages one of a plurality of notches formed in the upper section 12. In the illustrated embodiment, the pin 22 is secured proximate the middle of the lower section 16, but could be located at other positions on the lower section 16, as desired. In various embodiments, the pin 22 may support a washer or roller 28 to facilitate engagement with the notches.

The illustrated notches are substantially curvilinear; however, it should be understood that the notches in other embodiments may have different shapes, which are configured to engage the pin 22. In various embodiments, a pathway is provided to allow the pin to selectively move between notches to adjust the overall height of the liner 10. FIG. 3 illustrates one series of notches for adjusting the height "h" of the upper section 12 relative to the lower section 16. Other embodiments may include two or more circumferentially-spaced series of notches on the upper section 12 with associated pins secured to the lower section 16. The respective notches between the different series may be axially aligned. For example, respective pins could selectively engage the top notch of different series of notches at the same time.

The liner 10 is at its lowest height "h" when the pin 22 engages notch 24A and at its tallest height when the pin 22 engages notch 24C. The intermediate notches 24B cascade axially and circumferentially between the notch 24A and the notch 24C. These intermediate notches 24B provide intermediate height adjustments for the liner 10. In the illustrated embodiment, adjacent notches represent approximately one inch height difference. Some embodiments may not include an intermediate notch while others may have one or more intermediate notches. The height difference between adjacent notches may be more or less than one inch.

To adjust the height of the illustrated embodiment, the upper section 12 is slideably extended to disengage the pin 22 from one of the notches. The upper section 12 is then rotated and extended (or retracted) such that the pin is aligned with the desired notch and the upper section is then retracted with respect to the lower section 16 until the pin 22 engages the desired notch. The weight of the upper section 12 aids in retaining the engagement between the pin 22 and the desired notch. Engagement between the notch and the pin 22 maintains the overall height "h" of the assembly by discouraging the upper section 12 from retracting relative to the lower section 16 in an axial direction.

An advantage of the illustrated ratcheting embodiment is that the height of the liner 10 may be adjusted, either taller or shorter, by grasping and moving the upper section 12. Direct access to the locking mechanism, which may be deep within the pit, it not necessary. Thus, clearance between the pit 2 and the liner 10 can be minimal. Additionally, height adjustments may be possible even after the liner 10 has been backfilled. Other types of locking mechanism may require access to the actual locking mechanisms to provide adjustment, which could require removal of backfill material or additional clearance between the pit and the liner 10 to provide access.

FIG. 4 illustrates another embodiment of the locking mechanism. In this embodiment, the locking mechanism comprises a pin 50 that is configured to selectively engage one of a plurality of apertures 52 formed in the lower section 16 through an aperture formed in the upper section (not shown). In use, the upper section 12 is adjusted axially until the aperture formed in the upper section (not show) aligns with the desired aperture 52 formed in the lower section 16. The pin 50 is then placed into the aligned apertures.

Returning to FIG. 1, the upper section 12 of the liner 10 may include a support flange 14. The support flange 14 extends radially outwardly from the outer surface of the upper section 12 at a distance "d" from the top of the upper section 12. In use, the support flange 14 can further discourage movement of the upper section due to engagement of dirt backfilled around the liner 10 when installed.

The lower section 16 may include a support ledge 18 formed on its interior surface. As discussed in greater detail below, the support ledge 18 engages the meter platform 32 when the platform is at its lowermost position.

As noted above, the pipeline sections 8A,B extend into the pit 2 through suitable holes defined by the liner 10. Two lengths of pre-coiled flexible tubing 25A,B within the meter pit 2 are connected to the respective pipe sections 8A,B. The pre-coiled tubing 25A,B can be, for example, formed from plastic, such as polyethylene, or other suitable material. As will be appreciated by those skilled in the art, pipe fittings may be attached to the ends of the pipe sections 8A,B and these fittings may extend into the pit 2 through the liner 10 as opposed to the pipe sections themselves. The fittings may facilitate connection between the pipe sections 8A,B and the two lengths of flexible tubing 25A,B, respectively.

The opposite ends of the two lengths of flexible tubing are in fluid communication with a flow meter 30. In various embodiments, one of the lengths of flexible tubing is connected to the flow meter 30 through a coupling 36. The other length of flexible tubing may be connected to the flow meter 30 via a valve 38. A benefit of the valve 38 is to allow a user to stop the flow of liquid through the flow meter 30 to perform maintenance on the flow meter 30. As will be understood by those skilled in the art, the flow meter 30 may be connected to the lengths of flexible tubing through one or more valves and/or couplings.

In various embodiments, the flow meter 30 is mounted to a platform 32. The platform 32 may define suitable apertures to facilitate connection of the flow meter 30 to the lengths of flexible tubing 25A,B. The platform 32 may be annular to permit the upward flow of warm air that may result from circulation induced by a temperature differential between the top and the bottom of the pit.

A latch 40 may be slidably mounted to the platform 32. As discussed in greater detail below, this latch may be extended beyond the top of liner 10 to retain the platform 32 at approximately ground level when the platform 32 is raised to that elevation. In various other embodiments, the latch 40 may be extended to engage an aperture defined by the liner as opposed to the top of the liner 10.

Embodiments of the present disclosure may be installed on new or existing pipelines. A first step in installing embodiments of the present disclosure is to form a pit 2 at the desired location and to position the liner 10 such that two sections of pipe 8A,B extend through suitable apertures formed in the liner 10 and terminate within the liner 10. Earth may then be partially backfilled around the liner 10 to maintain its position and orientation. In other embodiments, the two sections of pipe 8A,B do not extend into the pit but are instead connected to fittings that extend through the apertures formed in the liner 10. The fittings may be attached to the liner 10 prior to positioning the liner 10 into the pit 2.

In various embodiments, the upper section 12 and the lower section 16 are positioned into the pit as an assembly. In other embodiments, the lower section 16 may be placed in the pit and then the upper section 12 is slid onto the lower section 16. A plurality of upper sections 12 may be provided in which the different sections have different respective axial lengths. Depending on the expected overall length required of the liner 10, the appropriate length upper section 12 is selected and slid onto the lower section 16. Also, an installed upper section 12 may be removed and exchanged with a different upper section that has a different length as desired to adjust the overall length of the liner 10.

Next, two lengths of tubing 25A,B may be connected to the two pipe ends 8A,B, respectively and to the flow meter 30 through appropriate valves and connectors. After making the desired connections, the upper section 12 of the liner 10 may be raised to the desired height, such as ground level, and locked in place using the locking mechanism 20.

Once the upper section 12 is locked into place, earth may be backfilled around the liner 10. In some embodiments, earth is only backfilled up to the support flange 14 such that additional adjustments to the height of the liner 10 can be made. This can be beneficial if the final grade has not yet been established. Alternatively, the earth may be backfilled to the top of the liner 10. As will be appreciated by those skilled in the art, the liner height may be adjusted and earth backfilled around the liner 10 before or after making the connections between the pipes, the flexible tubing and the flow meter.

As shown in FIG. 1, the platform 32 and the flow meter 30 are in their normal lowermost operating position within the meter pit 2 where they are supported by the support ledge 18 formed in the lower section 16 of the liner 10 at a position above the coiled tubing. When access to the flow meter is desired for purposes such as meter reading, maintenance, inspection or replacement, a hook may be inserted into the meter pit 2 to engage the meter 30 or platform 32. Once engaged, the hook may be lifted to raise the flow meter 30 and its supporting platform 32 to ground level 6 as shown in FIG. 2. As the flow meter 30 and its supporting platform 32 rise, the lengths of tubing 25A,B uncoil to accommodate the upward movement. When the supporting platform 32 reaches ground level, the latch 40 may be slid into its extended position to engage the top of the liner 10 to retain the platform 32 at ground level 6. In other embodiments, a bar may be inserted beneath the supporting platform 32 to retain it at ground level 6. With the platform 32 at ground level 6, the flow meter 30 carried atop the platform 32 is also at ground level 6, and any operations to be performed on the flow meter can be done by workers at ground level without descending into the meter pit 2.

After reading or servicing the flow meter, latch 40 may be slid back towards the platform 32 and out of engagement with the top of the liner 10. The coiling force of the tubing in conjunction with the force of gravity tends to lower the platform 32 and the flow meter 30 into its lowermost position within the pit 2. The hook can be used to restrain the recoiling force of the lengths of tubing 25A,B in order to provide a smooth descent of the platform 32 and the flow meter 30 into the meter pit 2. As the platform 32 and flow meter 30 descend, the lengths of tubing 25A,B recoil. When the tubing is in its completely recoiled position, the platform and flow meter may be in their original operating position within the meter pit 2.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A pit liner comprising:
    a tubular upper section;
    a tubular lower section;
    at least one pin, each pin connected to one of the upper section and the lower section, each pin projecting radially outwardly from the one of the upper section and the lower section;
    at least one notch array defined in at least one of the upper section and the lower section, each pin protruding into one notch array, each array including an upper notch, a lower notch, and at least one intermediate notch positioned axially and circumferentially between the upper notch and the lower notch, the lower section and the upper section sized to telescope with each other, each pin engaging one notch array; and
    a roller mounted on each pin, the roller facilitating engagement of each pin with each notch array.

2. The pit liner of claim 1, wherein each notch array includes at least twelve steps.

3. The pit liner of claim 2, wherein a rise of each notch array is at least twelve inches.

4. The pit liner of claim 1, wherein each notch array includes at least six steps.

5. The pit liner of claim 4, wherein a rise of each notch array is at least six inches.

6. The pit liner of claim 1, wherein each notch array is defined in a bottom end of the at least one of the upper section and the lower section.

7. The pit liner of claim 1, wherein each pin is connected to the section telescoping to the inside and each notch array is defined in the section telescoping to the outside.

8. An underground metering system for use with a water supply, the underground metering system comprising:
   an upper section defining a central space;
   a lower section defining a central space;
   at least one pin, each pin connected to one of the upper section and the lower section, each pin projecting radially outwardly from the one of the upper section and the lower section;
   at least one notch array defined in at least one of the upper section and the lower section, each pin protruding into one notch array, each array including an upper notch, a lower notch, and at least one intermediate notch positioned axially and circumferentially between the upper notch and the lower notch, the lower section and the upper section sized to telescope with each other;
   a meter disposed within the central space of at least one of the upper section and the lower section; and
   flexible tubing connecting the meter with the water supply; and
   a washer mounted on each pin, the washer facilitating engagement of each pin with each notch array.

9. The underground metering system of claim 8, wherein each notch array is defined in a bottom end of the at least one of the upper section and the lower section.

10. The underground metering system of claim 8, wherein each pin engages one notch array.

11. The underground metering system of claim 8, wherein each notch array includes twelve steps.

12. The underground metering system of claim 11, wherein a rise of each notch array is about twelve inches.

13. The underground metering system of claim 8, wherein each notch array includes six steps.

14. The underground metering system of claim 13, wherein a rise of each notch array is at least six inches.

15. The underground metering system of claim 8, wherein each pin is connected to the section telescoping to the inside and each notch array is defined in the section telescoping to the outside.

16. A pit liner comprising:
    a tubular upper section;
    a tubular lower section;
    at least one pin, each pin connected to one of the upper section and the lower section, each pin projecting radially outwardly from the one of the upper section and the lower section; and
    at least one notch array defined in at least one of the upper section and the lower section, each pin protruding into one notch array, each array including an upper notch, a lower notch, and at least one intermediate notch positioned axially and circumferentially between the upper notch and the lower notch, the lower section and the upper section sized to telescope with each other, each pin engaging one notch array; and
    a washer mounted on each pin, the washer facilitating engagement of each pin with each notch array.

17. The pit liner of claim 16, wherein each notch array is defined in a bottom end of the at least one of the upper section and the lower section.

18. The pit liner of claim 16, wherein each pin is connected to the section telescoping to the inside and each notch array is defined in the section telescoping to the outside.

19. An underground metering system for use with a water supply, the underground metering system comprising:
    an upper section defining a central space;
    a lower section defining a central space;
    at least one pin, each pin connected to one of the upper section and the lower section, each pin projecting radially outwardly from the one of the upper section and the lower section;
    at least one notch array defined in at least one of the upper section and the lower section, each pin protruding into one notch array, each array including an upper notch, a lower notch, and at least one intermediate notch positioned axially and circumferentially between the upper notch and the lower notch, the lower section and the upper section sized to telescope with each other; and
    a meter disposed within the central space of at least one of the upper section and the lower section;
    flexible tubing connecting the meter with the water supply; and
    a roller mounted on each pin, the roller facilitating engagement of each pin with each notch array.

20. The underground metering system of claim 19, wherein each pin is connected to the section telescoping to the inside and each notch array is defined in the section telescoping to the outside.

* * * * *